US012584581B2

(12) United States Patent
Alakkas et al.

(10) Patent No.: US 12,584,581 B2
(45) Date of Patent: Mar. 24, 2026

(54) SPLIT TEE PLUG DEVICE

(71) Applicant: SAUDI ARABIAN OIL COMPANY,
Dhahran (SA)

(72) Inventors: Ahmad Alakkas, Al Hofuf (SA); Saleh Alkulaib, Al Ahsa (SA); Faisal N. Otaibi, Al Hofuf (SA)

(73) Assignee: SAUDI ARABIAN OIL COMPANY,
Dhahran (SA)

( * ) Notice: Subject to any disclaimer, the term of this patent is extended or adjusted under 35 U.S.C. 154(b) by 213 days.

(21) Appl. No.: 18/651,484

(22) Filed: Apr. 30, 2024

(65) Prior Publication Data

US 2025/0334217 A1     Oct. 30, 2025

(51) Int. Cl.
F16L 41/06 (2006.01)
F16L 55/11 (2006.01)
G01M 3/28 (2006.01)

(52) U.S. Cl.
CPC .............. F16L 41/06 (2013.01); F16L 55/11 (2013.01); G01M 3/2815 (2013.01)

(58) Field of Classification Search
CPC ........ F16L 41/06; F16L 55/11; F16L 55/1116; F16L 17/02; F16L 17/06; F16L 17/10; G01M 3/2853; G01M 3/2861
See application file for complete search history.

(56) References Cited

U.S. PATENT DOCUMENTS

| | | | | |
|---|---|---|---|---|
| 1,833,700 A | * | 11/1931 | Wolf ..................... | F16L 55/124 |
| | | | | 81/125 |
| 3,155,116 A | | 11/1964 | Burton | |
| 3,406,864 A | * | 10/1968 | Schmidt .................. | F16L 37/02 |
| | | | | 220/327 |
| 4,058,142 A | | 11/1977 | Rankin | |
| 4,344,460 A | * | 8/1982 | Galos ..................... | F16L 55/11 |
| | | | | 138/92 |
| 5,101,545 A | * | 4/1992 | Mori ...................... | F16L 55/26 |
| | | | | 29/402.09 |
| 5,842,496 A | * | 12/1998 | Delanty ................. | F16L 41/06 |
| | | | | 156/303.1 |
| 6,732,762 B2 | | 5/2004 | Russell | |
| 9,829,141 B2 | * | 11/2017 | Vazzana ................. | F16L 55/11 |
| 10,295,101 B2 | * | 5/2019 | Piontek ................. | F16L 19/025 |
| 10,718,458 B2 | * | 7/2020 | Nelson .................... | F16L 41/06 |
| 2013/0019447 A1 | * | 1/2013 | Fitch ...................... | F16L 17/10 |
| | | | | 285/133.21 |

* cited by examiner

*Primary Examiner* — Reinaldo Sanchez-Medina
(74) *Attorney, Agent, or Firm* — Osha Bergman Watanabe & Burton LLP

(57) ABSTRACT

Systems and methods for intervention in a pipe in a pipeline network. The system includes a hot tap assembly. The hot tap assembly includes a sleeve positioned around the pipe, a housing coupled to a flange connection, and a neck connecting the sleeve to the housing. The hot tap assembly further includes a plug in an interior of the housing, an O-ring in an annular groove formed around a side of the plug, and a grease injection port extending at least partially through a wall of the housing and fluidly connected between an exterior of the housing and the annular groove for sealant injection. The hot tap assembly further includes a pressure test port fluidly connecting the exterior of the housing to the interior of the housing, a valve fluidly connected to the pressure test port, and an interlocking mechanism extending between and interlocking the plug and the housing.

20 Claims, 3 Drawing Sheets

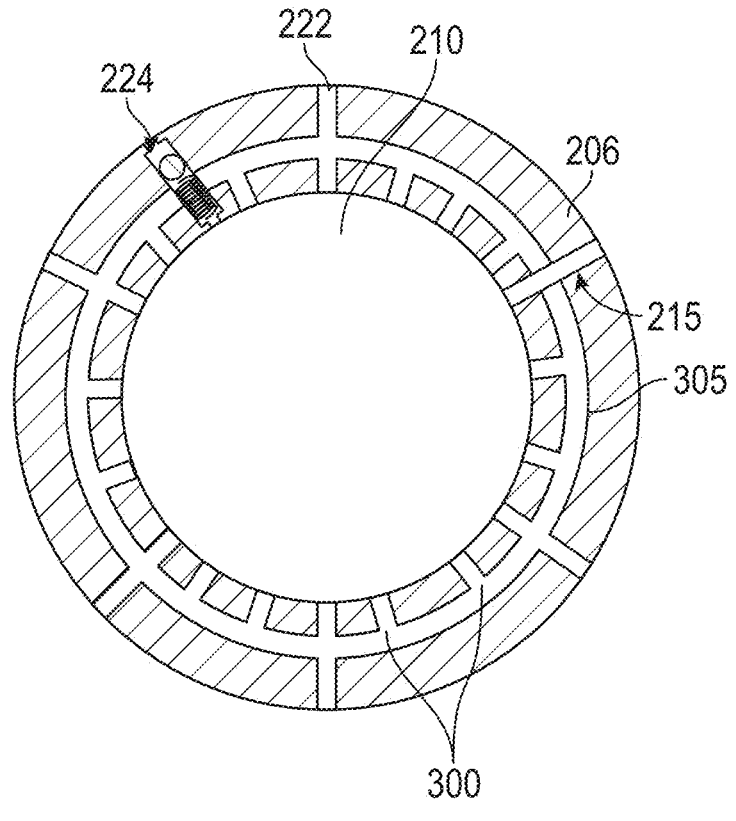
FIG. 3
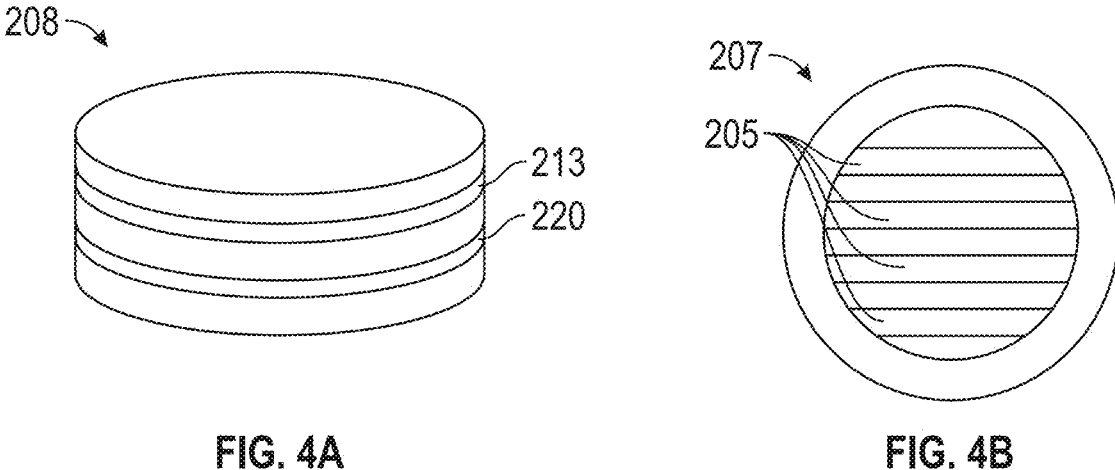
FIG. 4A                    FIG. 4B

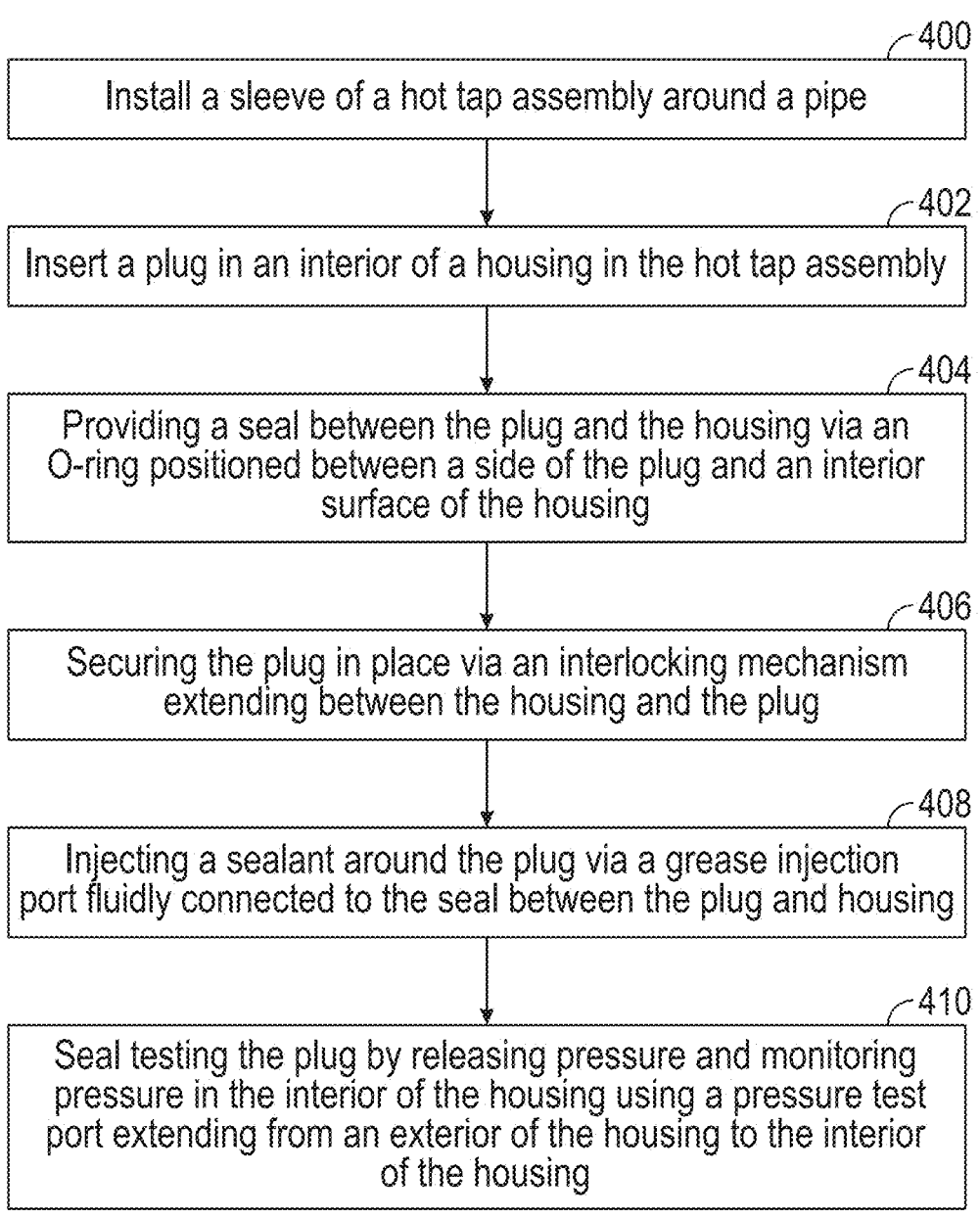

400

Install a sleeve of a hot tap assembly around a pipe

402

Insert a plug in an interior of a housing in the hot tap assembly

404

Providing a seal between the plug and the housing via an
O-ring positioned between a side of the plug and an interior
surface of the housing

406

Securing the plug in place via an interlocking mechanism
extending between the housing and the plug

408

Injecting a sealant around the plug via a grease injection
port fluidly connected to the seal between the plug and housing

410

Seal testing the plug by releasing pressure and monitoring
pressure in the interior of the housing using a pressure test
port extending from an exterior of the housing to the interior
of the housing

FIG. 5

SPLIT TEE PLUG DEVICE

BACKGROUND

In the field of oil and gas, hot tapping and line stopping operations are conducted in pipeline networks for repairs or expansions to be completed without depressurizing the network. Hot tapping (sometimes referred to as pressure tapping) refers to the process of tapping (e.g., drilling) into a live pipe (or other pressure vessel) having a pressure therein to make a connection without having to empty that section of the live pipe. Hot tapping tools typically include a tee fitted around the live pipe and a tapping tool that drills into the live pipe to fluidly connect the interiors of the live pipe and tee. A valve is commonly used to prevent fluid in the live pipe from leaking out through the tee after tapping.

After hot tapping, a valve to the tee may be opened and a line stopping tool may be inserted through the hot tap connection into the live pipe to perform a line stopping operation. For example, a line stopping tool may include a plugging head that is inserted into the live pipe to isolate a portion of the live pipe. Upon completion of the line stopping operation, it is common for a plug (e.g., a Lock O-ring® plug) to be implemented into the tee to create a leak-proof seal of the hot tap connection. Plugs to a hot tap connection are commonly seal tested to ensure a proper seal.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for a pipeline network, the system comprising: a pipe in the pipeline network; and a hot tap assembly, comprising: a sleeve positioned around the pipe; a housing coupled to a flange connection; a neck connecting the sleeve to the housing; a plug in an interior of the housing; an O-ring in an annular groove formed around a side of the plug; a grease injection port extending at least partially through a wall of the housing and fluidly connected between an exterior of the housing and the annular groove for sealant injection; a pressure test port fluidly connecting the exterior of the housing to the interior of the housing; a valve fluidly connected to the pressure test port; and an interlocking mechanism extending between and interlocking the plug and the housing.

In one aspect, embodiments disclosed herein relate to a system for intervention in a pipe, comprising: a tee, comprising: a sleeve positioned around the pipe; and a branch portion extending outwardly from the sleeve, the branch portion comprising: a housing fluidly connected to the sleeve via a neck; and a flange connection provided at an end of the housing opposite from the neck; a plug in an interior of the housing; an O-ring between a side of the plug and an interior surface of the housing; a flow path network formed through a wall of the housing fluidly connecting an exterior of the housing to the interior of the housing, the flow path network comprising a grease injection port extending from an opening at the exterior of the housing into the wall; a pressure test point integrated into the wall of the housing, the pressure test point comprising: a pressure test port fluidly connecting the exterior of the housing to the interior of the housing; and a valve disposed within the pressure test port;

and an interlocking mechanism extending between and interlocking the plug and the housing.

In one aspect, embodiments disclosed herein relate to a method comprising: installing a hot tap assembly around a pipe, wherein the hot tap assembly comprises a tee having a branch portion extending outwardly from a sleeve, and wherein the installing comprises connecting the sleeve around an outer surface of the pipe; locating a plug inside a housing in the branch portion of the tee; providing a seal between the plug and the housing via an O-ring in an annular groove formed around a side of the plug; securing the plug inside the housing via a locking pin extending through the housing and partially into the side of the plug; injecting a sealant around the plug via a grease injection port fluidly connected to the annular groove; and seal testing the seal between the plug and the housing, the seal testing comprising measuring a pressure change in an interior of the housing using a pressure test port extending from an exterior of the housing to the interior of the housing.

Any combinations of the various embodiments and implementations disclosed herein can be used in a further embodiment, consistent with the disclosure. Other aspects and advantages of the claimed subject matter will be apparent from the following description and the appended claims.

BRIEF DESCRIPTION OF DRAWINGS

FIG. 3 shows a housing used in conjunction with FIG. 2 in accordance with one or more embodiments.

FIGS. 4A and 4B show examples of types of plugs that may be installed in a hot tap assembly according to embodiments of the present disclosure.

FIG. 5 shows a flowchart in accordance with one or more embodiments.

DETAILED DESCRIPTION

Figures 1, 2:
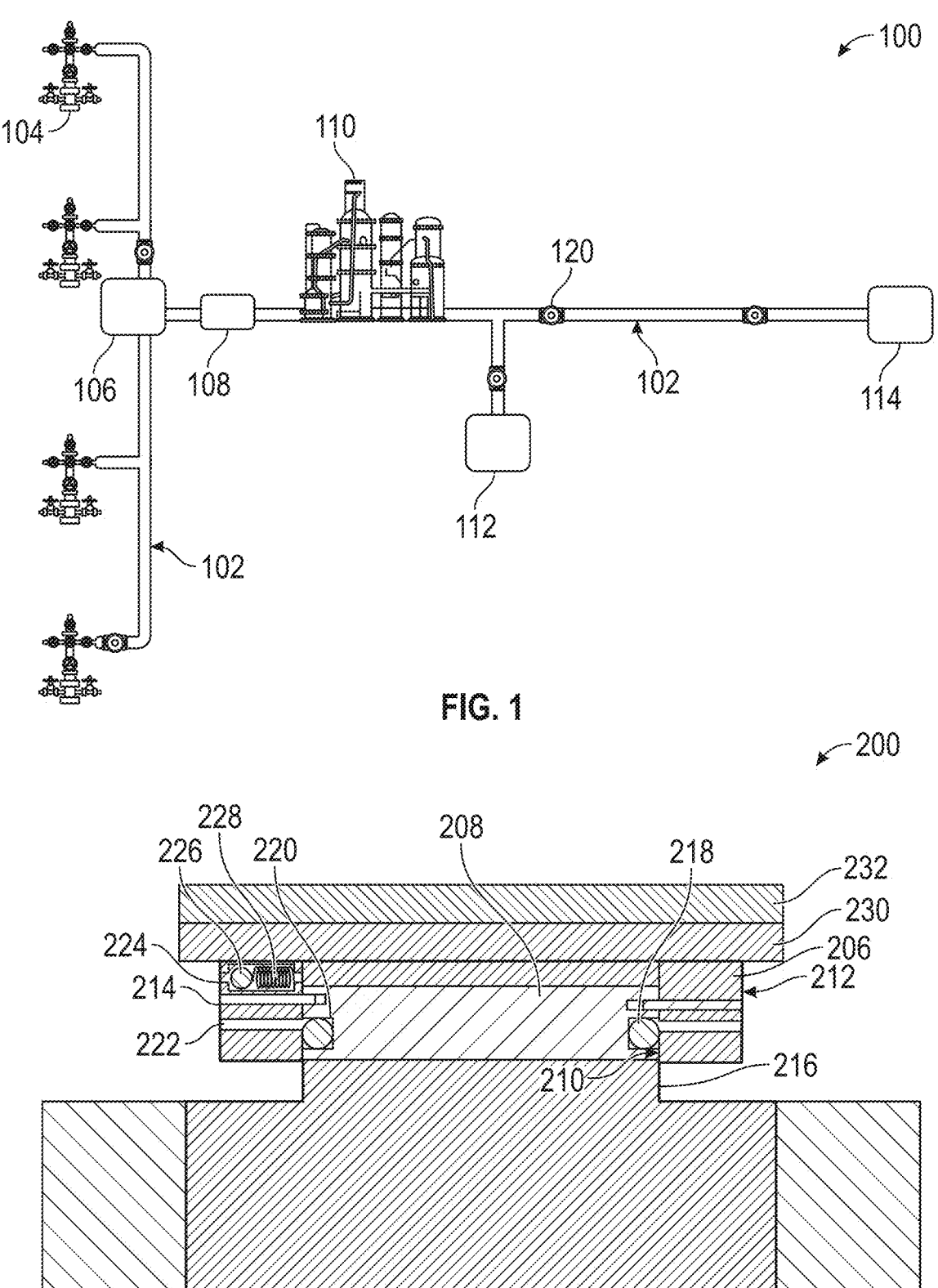
FIG. 1 shows an exemplary pipeline system in accordance with one or more embodiments.
FIG. 2 shows a hot tap assembly system in accordance with one or more embodiments.

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one aspect, embodiments disclosed herein relate to systems and methods for installing and seal testing a hot tap assembly in a pipeline network to provide a hot tap connection to a pipe in the pipeline network. Hot tap assemblies disclosed herein may allow a line stopping tool to be inserted through the hot tap connection into the pipe to perform a line stopping operation. Line stopping or line plugging operations may include inserting a plugging head into a pipe for isolating a portion of the pipe and provide a shut off where none previously existed.

For example, in the oil and gas industry, when a pipeline needs repair or additions, a line stopping operation including hot tapping may be conducted on the pipeline to isolate the desired pipe requiring service. During hot tapping, a hot tap assembly described herein may be installed around a desired pipe section for installing hot tapping equipment and branch connections or bypass line. The hot tap assembly may include a tee having a sleeve portion and a branch portion, where the sleeve portion may be welded to the outside of the pipe on each end of the sleeve. Hot tapping equipment may include a hole saw, which may be inserted through the branch portion of the hot tap assembly to cut an opening in the pipe. A line plugging head may then be inserted into the cut opening to plug the pipe. In some line stopping operations, two hot tap assemblies may be installed around a section of pipe, and line plugging heads may be inserted through each hot tap assembly to isolate the section of pipe between the hot tap assemblies. Once the isolated section of pipe is serviced or replaced, the line plugging heads may be removed and a plug may be inserted into the branch portion of each hot tap assembly in order to seal the hot tap openings. Systems and methods disclosed herein include hot tap assemblies capable of leak-proof sealing and seal testing.

FIG. 1 shows an exemplary pipeline system with a hot tap assembly in accordance with one or more embodiments. The pipeline system in FIG. 1 depicts one illustrative example of how hot tap assemblies according to embodiments of the present disclosure may be used with pipelines (102) employed and arranged in example oil and gas operations. However, it will be appreciated that hot tap assemblies according to embodiments of the present disclosure may be used with numerous other pipeline systems and operations and are not limited to use in the example shown in FIG. 1. In the example in FIG. 1, pipelines (102) are connected together in a gathering pipeline system (100), e.g., as commonly employed in the oil and gas industry, but could also represent a pipeline found in any of a great variety of other conceivable physical settings or operating contexts. For example, the pipelines (102) may be in systems, such as but not limited to petroleum transportation.

In the example shown in FIG. 1, the system includes pipelines (102) used for gathering hydrocarbons from wells via wellheads (104) to a storage tank (106). Storage tanks (106) may be containers or reservoirs for temporary holding products, such as oil and gas. Storage tanks (106) may be above ground, semi subterranean, or subterranean. The wellheads (104) may be connected through pipelines (102) to a great variety of equipment positioned on-site, such as pump stations (108). Pump stations (108) may be used to maintain flow and pressure of hydrocarbons for transportation. The pipelines (102) may be used to transport hydrocarbons to a plant (110), such as a refinery or chemical plant. Pipelines (102) in gathering systems may be tens of hundreds of miles in length to cross state and continental borders. The pipelines (102) may transport refined products from the plant (110), such as gasoline, kerosene, and petrochemicals. The plants (110) may be connected through pipelines (102) to a variety of end users, such as storage facilities (112) and distribution terminals (114).

A hot tap assembly (120) according to embodiments of the present disclosure may be used on one or more of the pipeline (102), e.g., in order to perform line stopping operations to replace, fix, or expand sections of the pipeline. The hot tap assembly (120) may be used on other types of piping networks including pipelines servicing water, crude, gas, and/or chemical.

FIG. 2 shows a system in accordance with one or more embodiments. Specifically, FIG. 2 shows a hot tap assembly (200) installed on a pipe (202). The pipe (202) may be any part of a pipeline network or system, such as the gathering system (100) described in FIG. 1. The pipe (202) may undergo a hot tapping operation involving cutting a hole in the pipe (202) inside the hot tap assembly (200). The hot tap assembly (200) may be made up of any metal material known in the art for split tees capable of welding in harsh outside environments, such as carbon steel.

The hot tap assembly (200) includes a tee having a sleeve (204) and a branch portion extending outwardly from the sleeve (204) between the axial ends of the sleeve (204). The sleeve and branch portion of the tee provides three openings: two at the axial ends of the sleeve and one at the end of the branch portion, where the interior passages through the sleeve and branch portion connect in a general "T" shape. The sleeve (204) is fitted around the pipe (202), while hot tapping equipment may be inserted through the branch portion of the tee to hot tap the portion of the pipe (202) fitted within the sleeve (204). The sleeve (204) may be a snug-fitting sleeve widely utilized in the industry. In one or more embodiments, the sleeve (204) may be formed of two or more sleeve pieces (e.g., a split sleeve), where the sleeve pieces may be assembled around the outer surface of the pipe (202) and welded together to fit the sleeve (204) around the pipe (202). For example, a sleeve may be split longitudinally into halves, including a top half having the branch portion and a bottom half, where the halves may be assembled around a pipe and welded together along the split lines. Further, the sleeve (204) may be welded at its axial ends to the pipe (202) to connect the sleeve (204) to the pipe (202).

The branch portion of the hot tap assembly (200) includes a housing (206) connected to the sleeve (204) via a neck (216). The neck (216) may be welded to the sleeve (204), integrally formed with the sleeve (204), or otherwise connected to the sleeve (204). When conducting a hot tapping operation, a hot tapping machine (e.g., a hole cutter or drill) may be inserted through the interiors of the housing (206) and neck (216) to cut a hole (not shown) into the portion of the pipe (202) fitted within the sleeve (204). The subsequently-formed hole (not shown) in the pipe (202) from the hot tapping operation fluidly communicates the pipe's (202) interior flow path to the neck (216).

The hot tap assembly (200) may be manufactured to meet the requirements for fittings with a hot tap machine. For example, a flange connection (230) may be provided on the branch portion at an end of the housing (206) opposite the neck (216). The flange connection (230) may be a flange welded to or integrally formed with the housing (206). The flange connection (230) may be used to connect the hot tap assembly (200) with other pipe connections or equipment, such as hot tapping equipment, including but not limited to sandwich valves, tapping machines, and housings. For example, in some embodiments, as shown in FIG. 2, a blind flange (232) may be installed on the flange connection (230) to contain any fluid in the hot tap assembly (200) after completion of a hot tapping operation. The blind flange (232) may be removed from the hot tap assembly (200) to conduct a hot tapping or line stopping operation, such as re-tapping, after seal testing the hot tap assembly (200). In such instances, a gate valve may be installed on the flange connection (230) to be used during hot tapping activity. Examples of suitable gate valves include, but are not limited to, gate valves sold under the trademark, sandwich, such as described in U.S. Pat. Nos. 3,047,266 and 4,609,209, which are incorporated herein by reference.

After a hot tapping operation, a plug may be fitted within the interior (210) of the housing (206). In the embodiment shown in FIG. 2, plug (208) is fitted within the interior (210) of the housing (206) to plug flow from a hot tapped hole in the pipe (202) and seal the hole (not shown) from the opening of the branch portion housing (206). FIG. 4A shows a perspective view of the plug (208) shown in FIG. 2. The plug (208) may have an outer diameter that is substantially the same as an inner diameter of the housing (206), such that the plug (208) may be fitted within and sealed to the inner diameter of the housing (206).

In one or more embodiments, such as shown in FIGS. 2 and 4A, the plug (208) may be a solid plug, such that when the plug is fitted within and sealed to the inner diameter of the housing, the plug body extends through the entire cross-sectional area of the housing defined by the inner diameter. For example, a solid plug may have a solid plug body without any through-holes.

In some embodiments, such as shown in FIG. 4B, the plug may be a flow-through plug (207) having a flow path formed through the axial height of the plug and guide bars (205) extending across the flow path. FIG. 4B shows a top view of the flow-through plug (207), where the flow path is defined through a cylindrical wall, and the guide bars (205) extend in a parallel arrangement in a direction transverse to the flow path. It may be appreciated that various configurations of flow-through plugs, including different amounts of guide bars extending in different directions, may be used. A flow-through plug (207) may be installed in a hot tap assembly according to embodiments of the present disclosure, for example, during pigging operations (where a device is run through the pipeline, e.g., to displace or separate fluids in the pipeline, to clean the pipeline, and/or inspect the pipeline), to allow a fluid to move through the branch portion of the hot tap assembly while the guide bars (205) may guide a pig device onward through the pipeline with the main flow.

The plug (208) may be sealed to the inner diameter of the housing (206) using one or more O-rings (218). For example, as shown in FIG. 2, an O-ring (218) is fitted in an annular groove (220) formed around the side of the plug (208), where the O-ring (218) and annular groove (220) extend circumferentially around the entire side of the plug (208). The depth of the annular groove and thickness of the O-ring are sized to have the O-ring (218) contact and seal against both the annular groove (220) and the inner diameter of the housing (206), thereby creating a seal between the plug (208) and the inner diameter of the housing (206). O-rings may be used to help seal pressure within the hot tapped pipe (202) and prevent leaking of fluids.

The plug (208) may be secured in place using one or more interlocking mechanisms between the plug (208) and the housing (206). For example, in FIG. 2, the plug (208) is secured in place with one or more locking pins (214) extending through the housing (206) and partially into the side of the plug (208). In one or more embodiments, a locking pin (214) may be assembled in the hot tap assembly (200) by inserting the locking pin (214) through a locking pin hole extending from the exterior (212) of the housing (206) to the interior (210) of the housing (206). The locking pin (214) may be inserted through the locking pin hole until the inserted end extends into a corresponding recess (e.g., annular recess (213) shown in FIG. 2B) or hole in the plug (208). A locking pin (214) may be secured in place, for example, using a plug or threaded connection (e.g., a retainer screw). In some embodiments, an interlocking mechanism may include a locking device (e.g., a segment or pin) that may be expanded from the plug to lock into a corresponding recess or hole formed in the interior wall of the housing.

Keeping with FIG. 2, the hot tap assembly (200) includes one or more grease injection ports (222) fluidly communicating the exterior (212) of the housing (206) to the interior (210) of the housing (206). The plug (208) is fitted and retained in a position in the interior (210) of the housing such that the grease injection port(s) are also in fluid communication with the annular groove (220) formed around the plug (208). In such manner, when the plug (208) is assembled in the interior (210) of the housing, a sealant may be injected through the grease injection ports (222) into the annular groove (220) and around the O-ring (218) to aid with sealing the plug (208) in the housing (206). The sealant may be made up of a material, such as grease or silicon. The sealant injected may be considered a safety seal in case the O-ring (218) failed to hold pressure of the pipe (202).

According to embodiments of the present disclosure, grease injection port(s) (222) may be fluidly connected to the interior (210) of the housing by extending directly from the exterior (212) to the interior (210) of the housing and/or via one or more grease channels. One or more grease channels may fluidly connect a single grease injection port to one or more additional locations in the interior of the housing in order to help distribute a sealant injected through the grease injection port to multiple interior locations in the housing.

For example, FIG. 3 shows a plan drawing of the housing (206) as viewed from the top of the housing (206), where grease injection ports (222) are fluidly connected to the interior (210) of the housing (206) at multiple circumferential locations via multiple grease channels (300) and a grease connection channel 305. In this embodiment, each grease injection port (222) extends into the housing from the exterior of the housing and intersects a grease connection channel (305). The grease connection channel (305) may be of circular form, such as a ring, to wrap concentrically through the housing wall. Multiple grease channels (300) circumferentially spaced around the housing (206) intersect with and extend from the grease connection channel (305) to fluidly communicate with the interior (210) of the housing. In such embodiments, the grease connection channel (305) may communicate with a large number of grease channels (300) and grease injection ports (222). In one or more embodiments, a sealant may be injected through the grease injection ports (222), which may then flow through the grease connection channel (305) to the multiple connected grease channels (300) to be communicated to the interior of the housing (206). For example, the grease connection channel (305) may distribute sealant (e.g., grease) injected from the grease injection ports (222) around the perimeter of the plug (208) and into the annular grooves (220) shown in FIG. 2.

Thus, in the example shown in FIG. 3, a flow path network of fluidly connected flow paths formed through the wall of the housing comprising grease injection ports (222), a grease connection channel (305), and grease channels (300) may be used to inject a sealant from one or more exterior locations through the wall of the hot tap assembly housing to multiple additional interior locations. By providing a flow path network having multiple branch flow paths (e.g., grease channels) fluidly connecting a single grease injection port to multiple interior locations in the housing, a sealant may be injected through the single grease injection port to the multiple interior locations to increase distribution of the sealant around a seal between a plug and the housing. In one or more embodiments, flow path networks including other designs of flow paths extending through the wall of a hot tap assembly housing may be envisioned to allow sealant injection from the exterior of the housing to the interior of the housing. For example, while the embodiment shown in FIG. 3 has three grease injection ports (222) circumferentially spaced around the housing (206), one, two, or more than three grease injection ports (222) may be circumferentially spaced around the housing (206). Additionally, in one or more embodiments, two or more grease channels (300) may be provided for each grease injection port (222) (e.g., in a ratio ranging from 2 to 20 grease channels to each grease injection port).

In one or more embodiments, a flow path network may be formed along a single axial plane through the housing, such as shown in FIGS. 2 and 3, at an axial location that corresponds with the axial location of a seal around a plug installed in the housing. Similarly, interlocking mechanisms (e.g., locking pins (214), locking pin holes (215), and recesses (213)) between a hot tap assembly housing and a plug may be provided along a shared axial plane when the plug is installed in the hot tap assembly housing.

According to embodiments of the present disclosure, a hot tap assembly may further include an integrated pressure test point positioned at an axial location along the housing farther away from the sleeve portion of the assembly (and any pipe running through the sleeve) than the hot tap assembly seal and interlocking mechanisms. For example, as shown in FIGS. 2 and 3, an integrated pressure test point may include a pressure test port (224) extending from the interior (210) of the hot tap assembly housing (206) to the exterior (212) of the housing (206). The pressure test port (224) may be positioned at an axial location along the housing farther away from the sleeve portion of the assembly than the plug (208). By providing the pressure test port (224) exterior to the plug, the integrated pressure test point may be used to test if there is a pressure leak in the seal between the plug (208) and the housing (206). The integrated pressure test point may further include a valve (226) and an activation mechanism (e.g., a spring 228) disposed within the pressure test port (224), which are designed to release and maintain pressure within an enclosed interior portion of the housing (206). For example, the housing (206) may be closed at or near its axial ends (e.g., as shown in FIG. 2, by the plug (208) at one end and by a blind flange (232) at the other end) to provide an enclosed interior portion of the housing (206) in communication with the integrated pressure test point.

The pressure test point allows for seal testing of a plug installed in the hot tap assembly housing by performing pressure holdup tests, e.g., including pressurizing and releasing the pressure in the housing after installation of the plug. In one or more embodiments, after a sealant is injected through a grease injection port to seal a plug within a hot tap assembly housing, the area of the housing interior sealed off from the pipe by the installed plug may be pressurized, e.g., by injecting air into through the pressure test port or during a hot tapping operation. A pressure holdup test according to one or more embodiments may include releasing pressure through the pressure test port (224) by activating the activation mechanism of the pressure test point. For example, in the embodiment shown in FIG. 2, a valve (226) and spring (228) disposed within the pressure test port (224) may be actuated to release pressure inside the housing (206) after the plug (208) has been installed in the housing. The pressure released indicates whether the plug (208) has been completely sealed within the interior of the housing. In some embodiments, the pressure test port (224) is actuated by screwing a small pipe thread connection or pipe fitting to the valve (226) similar to a Schrader valve. For example, screwing or bolting a pipe fitting to the valve (226) compresses the spring (228) to either pressurize (allow fluid flow into) the housing or depressurize (allow fluid flow in the opposite direction, out of) the housing (206), and/or use a pressure gauge during a pressure holdup test.

Pressure in an area of the housing interior that is sealed off from a hot tapped pipe by the installed plug may be monitored using one or more pressure sensors, e.g., in the housing interior or fluidly connected to the pressure test port (224) outside of the hot tap assembly housing. The monitored pressure from a pressure test point during pressure testing of a plug seal within a hot tap assembly housing may be used to indicate if fluid is able to pass through the seal between the installed plug and housing (which may sometimes be referred to as passing occurrence). For example, measuring a pressure above a selected pressure range in a pressure holdup test may indicate to a user, such as an operator, a passing occurrence where an installed plug (208) does not seal off pressure from a hot tapped pipe (202). When a pressure holdup test indicates a passing occurrence, e.g., that a plug (208) has failed to hold off pressure from the pipe (202), then sealant material may be injected through the grease injection ports (222) to provide additional sealant and thus improve the seal between the plug (208) and the housing (206).

FIG. 5 shows a flowchart in accordance with one or more embodiments. Specifically, FIG. 5 describes methods for installing and using a hot tap assembly according to embodiments of the present disclosure around a pipe. One or more blocks in FIG. 5 may be performed by one or more components (e.g., as described in FIGS. 2 and 3). While the various blocks in FIG. 5 are presented and described sequentially, one of ordinary skill in the art will appreciate that some or all of the blocks may be executed in parallel. Furthermore, the blocks may be performed actively or passively.

In Block 400, a hot tap assembly is installed around a pipe in a pipeline network. The hot tap assembly includes a tee having a general shape of a junction between three conduits, where the tee is formed of a sleeve and a branch portion extending outwardly from the sleeve. Installing a hot tap assembly around a pipe may include assembling the sleeve around the pipe. e.g., by assembling sleeve pieces around the pipe and then welding the sleeve pieces together. The branch portion of a hot tap assembly may include a housing fluidly connected to the interior of the sleeve via a neck. Prior to installing a sleeve of a hot tap assembly around a pipe, the neck may be welded to the sleeve to form the hot tap assembly. In Block 402, a plug is inserted in an interior of the housing. In Block 404, a seal is provided between the plug and the housing via an O-ring positioned between a side of the plug and an interior surface of the housing. For example, in some embodiments, an O-ring may be fitted in an annular groove formed around a side of the plug, and then the plug fitted with the O-ring may be fitted inside the housing to provide the seal between the plug and the housing. In some embodiments, an O-ring may be positioned within a groove formed around an interior surface of the housing prior to fitting the plug inside the housing to provide the seal between the plug and the housing.

In Block 406, the plug is secured in place inside the housing via an interlocking mechanism(s) extending between the housing and the plug. For example, a locking pin may be inserted through a locking pin formed through a wall of the housing and partially into the side of the plug. In some embodiments, a retaining screw may be threaded at the exterior opening of the locking pin hole to retain the locking pin in place.

In Block 408, a sealant is injected around the plug via a grease injection port fluidly connected to the seal between the plug and housing. A sealant may be distributed from the grease injection port to multiple circumferential locations around the side of the plug via a flow path network formed through the housing wall, e.g., through multiple grease channels fluidly connected to one or more grease injection ports via a grease connection channel. The sealant may be injected to an annular groove holding an O-ring seal between the plug and housing via the multiple grease channels to provide sealant around the entire circumference of the plug. The sealant may be injected via one or more grease injection ports fluidly connected to grease channels via the grease connection channel.

In Block 410, the plug is seal tested by releasing pressure and monitoring pressure using a pressure test port extending from an exterior of the housing to the interior of the housing. Pressure in the interior of the housing may be released or maintained through the pressure test port using a valve and an activation mechanism (e.g., a spring) disposed within the pressure test port. For example, an activation mechanism in an integrated pressure test point may be activated by screwing or bolting a pipe fitting to the valve to release pressurized material, such as crude, gas, or water, from inside the interior of the housing. When the interior of the housing is depressurized (e.g., to where the interior of the housing has a pressure that is approximately atmospheric pressure), a pressure gauge may be used to monitor pressure in the interior housing. A detected pressure increase in the housing interior during the pressure monitoring may be an indication that there is a leak in the seal, which may then be repaired, for example, by injecting sealant around the seal between the plug and housing.

In one or more embodiments, a gate valve may be connected to the opening of the branch portion of the hot tap assembly tee (e.g., connected to a flange connection of the hot tap assembly branch portion), where the gate valve may be opened to allow equipment to be inserted through the hot tap assembly (e.g., to conduct hot taping activities and/or pipe plugging operations) and closed to seal the branch portion opening. For example, a gate valve may include a gate that slides in a direction transverse to the opening of the branch portion, such as sandwich-type valves. In one or more embodiments, when a pipe intervention operation is completed, a plug may be installed within the housing, as described above, and the plug may be pressure tested with the gate valve closed. When it is determined that the plug passes the pressure testing (e.g., when it is determined that the seal between the plug and the housing holds pressure in the connected pipe), the gate valve may be removed from the branch portion opening, and a blind plug (e.g., a blind flange) may then be connected to the branch portion opening to close the opening, thereby also enclosing the plug within the housing.

A blind flange may be installed on a flange connection of the hot tap assembly to block off fluid in the housing. The flange connection may be coupled to or integrally formed with the housing. In some embodiments, a line stopping operation is performed on the pipe before fitting the plug in the housing. The line stopping operation may include hot tapping the pipe to form a hole in the pipe and inserting a plugging head into the pipe from the hot tap assembly.

In one or more embodiments, a second hot tapping operation may be performed on the pipe after seal testing a plug installed in the hot tap assembly housing. In such instances when the same pipe section requires a second hot tapping operation, the hot tap assembly disclosed herein prevents the need to install new hot tapping equipment. Instead, in one or more embodiments, the second hot tapping operation may be performed, for example, by removing a previously installed blind flange and plug to perform the second hot tapping operation using the same previously installed hot tap assembly.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A system for a pipeline network, the system comprising:

a pipe in the pipeline network; and a hot tap assembly, comprising:

a sleeve positioned around the pipe;

a housing coupled to a flange connection;

a neck connecting the sleeve to the housing;

a plug in an interior of the housing;

an O-ring in an annular groove formed around a side of the plug;

a grease injection port extending at least partially through a wall of the housing and fluidly connected between an exterior of the housing and the annular groove for sealant injection;

a pressure test port fluidly connecting the exterior of the housing to the interior of the housing;

a valve fluidly connected to the pressure test port; and an interlocking mechanism extending between and interlocking the plug and the housing.

2. The system of claim 1, wherein the sleeve comprises multiple sleeve pieces assembled around an outer surface of the pipe and welded together.

3. The system of claim 1, further comprising a spring disposed within the pressure test port.

4. The system of claim 1, wherein the interlocking mechanism comprises a locking pin extending through a locking pin hole formed through the wall of the housing and partially into the side of the plug.

5. The system of claim 1, further comprising a blind flange installed on the flange connection.

6. The system of claim 1, wherein the neck is welded to the sleeve.

7. The system of claim 1, wherein the grease injection port is fluidly connected to a grease connection channel extending circumferentially through the wall of the housing, and wherein grease channels fluidly connect the grease connection channel to the annular groove.

8. The system of claim 7, further comprising a second grease injection port fluidly connected from the exterior of the housing to the grease connection channel, wherein a ratio of grease channels to grease injection ports ranges from 2 to 20.

9. The system of claim 1, wherein a hole is drilled through a side of the pipe, the hole fluidly communicating a flow path formed through the pipe to the neck.

10. A system for intervention in a pipe, comprising:
a tee, comprising:
　a sleeve positioned around the pipe; and
　a branch portion extending outwardly from the sleeve, the branch portion comprising:
　　a housing fluidly connected to the sleeve via a neck; and
　　a flange connection provided at an end of the housing opposite from the neck;
a plug in an interior of the housing;
an O-ring between a side of the plug and an interior surface of the housing;
a flow path network formed through a wall of the housing fluidly connecting an exterior of the housing to the interior of the housing, the flow path network comprising a grease injection port extending from an opening at the exterior of the housing into the wall;
a pressure test point integrated into the wall of the housing, the pressure test point comprising:
　a pressure test port fluidly connecting the exterior of the housing to the interior of the housing; and
　a valve disposed within the pressure test port; and
an interlocking mechanism extending between and interlocking the plug and the housing.

11. The system of claim 10, wherein the pressure test point is at an axial location along the housing farther away from the sleeve than the grease injection port.

12. The system of claim 10, wherein the flow path network further comprises multiple grease channels fluidly connecting the grease injection port to the interior surface of the housing.

13. A method, comprising:
installing a hot tap assembly around a pipe,
　wherein the hot tap assembly comprises a tee having a branch portion extending outwardly from a sleeve, and
　wherein the installing comprises connecting the sleeve around an outer surface of the pipe;

locating a plug inside a housing in the branch portion of the tee;
providing a seal between the plug and the housing via an O-ring in an annular groove formed around a side of the plug;
securing the plug inside the housing via a locking pin extending through the housing and partially into the side of the plug;
injecting a sealant around the plug via a grease injection port fluidly connected to the annular groove; and
seal testing the seal between the plug and the housing, the seal testing comprising measuring a pressure change in an interior of the housing using a pressure test port extending from an exterior of the housing to the interior of the housing.

14. The method of claim 13, further comprising releasing pressure from the interior of the housing using a valve and an activation mechanism disposed within the pressure test port.

15. The method of claim 13, further comprising:
blocking off fluid in the housing by installing a blind flange on a flange connection of the housing.

16. The method of claim 13, further comprising:
performing a hot tapping operation on the pipe before locating the plug in the housing.

17. The method of claim 13, further comprising:
performing a line stopping operation on the pipe after seal testing the plug.

18. The method of claim 13, wherein connecting the sleeve around the pipe comprising:
assembling sleeve pieces around the pipe;
welding the sleeve pieces together; and
welding the sleeve pieces to the outer surface of the pipe.

19. The method of claim 13, wherein injecting the sealant comprises distributing the sealant from the grease injection port to multiple grease channels via a grease connection channel, wherein the sealant is injected to the annular groove via the multiple grease channels.

20. The method of claim 19, further comprising:
injecting the sealant via a second grease injection port fluidly connected to grease channels via the grease connection channel; and
distributing the sealant through a channel system in the grease connection channel to distribute the sealant from the grease injection port around a perimeter of the plug.

\* \* \* \* \*